US005758601A

United States Patent [19]

Dickson

[11] Patent Number: 5,758,601
[45] Date of Patent: Jun. 2, 1998

[54] DISPOSABLE LITTER BOX FOR CATS AND OTHER HOUSEHOLD PETS

[76] Inventor: Charles H. Dickson, 1206 St. Andrews Blvd., Eustis, Fla. 32726

[21] Appl. No.: 752,247

[22] Filed: Nov. 19, 1996

[51] Int. Cl.⁶ .......................................... A01K 1/01
[52] U.S. Cl. .......................................... 119/170; 119/168
[58] Field of Search .......................... 119/168, 170, 119/165, 166, 167

[56] References Cited

U.S. PATENT DOCUMENTS

| | | | |
|---|---|---|---|
| 2,963,003 | 12/1960 | Oberg et al. | 119/165 |
| 3,416,495 | 12/1968 | Wilson | 119/165 |
| 4,171,680 | 10/1979 | Silver et al. | 119/165 |
| 4,627,382 | 12/1986 | Muzzey | 119/165 |
| 4,648,349 | 3/1987 | Larson | 119/168 |
| 4,716,853 | 1/1988 | d'Aniello | 119/165 |
| 4,763,603 | 8/1988 | Coes | 119/168 |
| 4,779,567 | 10/1988 | Smith | 119/165 |
| 4,807,564 | 2/1989 | Soberg et al. | 119/168 X |
| 4,858,559 | 8/1989 | Allen | 119/165 |
| 5,144,914 | 9/1992 | Giannakopoulos | 119/168 |
| 5,172,652 | 12/1992 | Dorbrin et al. | 119/165 |
| 5,249,549 | 10/1993 | Rockaitis | 119/165 |
| 5,359,960 | 11/1994 | Yananton | 119/165 |

Primary Examiner—Michael J. Carone
Assistant Examiner—Yvonne R. Abbott
Attorney, Agent, or Firm—Edward M. Livingston, Esq.

[57] ABSTRACT

A completely disposable litter container for cats and other household pets having a box with a bottom (6), four side walls (2a,b,c,d) and a moisture-impermeable bag (7) secured therein for holding litter material. The bag (7) may be pre-filled with litter material (8) prior to sale or after sale prior to use. An optional cover (3) is provided to fit within the side walls (2a,b,c,d) over the bag (7) to secure the bag in place during shipment and storage. The side walls (2a,b,c,d) of the pet litter container (1) are preferably tapered and slant outward from the bottom (6) of the container so that multiple litter containers can nest within each other and stacked for easy shipping and storage. To use the litter container, after the cover (3) is removed, the bag (7) is opened and folded over the side walls (2a,b,c,d) of the litter box (1). After use when a pet owner desires to dispose of the litter container, the bag can be closed and secured by tightening and tying a drawstring (11) at the top of the bag. This invention completely eliminates the unpleasant task of having to clean the litter box.

15 Claims, 3 Drawing Sheets

DISPOSABLE LITTER BOX FOR CATS AND OTHER HOUSEHOLD PETS

BACKGROUND OF THE INVENTION

This invention relates to a litter box for household pets, particularly cats and other small animals, said litter box being completely disposable.

Perhaps the most unpleasant task of owning a household pet, such as a cat, is cleaning its litter box. Although cats are in the habit of covering their feces and urine with litter, usually an absorbent granular material, the litter box still emits an unpleasant odor. Even after the litter has been changed, after little use the litter box soon emits an unpleasant odor.

In an effort to eliminate the unpleasant odor, a pet owner is faced with having to frequently clean the litter box, which usually means discarding all the cat litter in the box, an expensive waste of litter. Another option to eliminate the unpleasant odor is to remove some of the feces without discarding the litter, but this option is also unpleasant.

Either of the above options, that is frequent cleaning or removing the feces, still often requires the litter box to be washed and sanitized due to sticking of feces and urine to the inside of the container used as a litter box.

Thus, a need exists for a litter box that will solve the above problems associated with the unpleasant task of cleaning up after a pet.

The prior patented art includes many attempts to solve the above problems, but none has the same structure and features of the present invention. For instance, U.S. Pat. No. 4,627,382 issued to Muzzey on Dec. 9, 1986, teaches a disposable litter box made of cardboard with a peel-away top and a plastic or wax lining inside for moisture proofing. However, the Muzzey device is structurally different and is not resealable prior to disposal. U.S. Pat. No. 5,172,652, issued to Dobrin, et al. on Dec. 22, 1992, discloses a litter box with a tear away top for holding litter. U.S. Pat. No. 5,249,549 issued to Rockaitis, Ill. on Oct. 5, 1993, discloses another disposable litter box made of wax-lined water-absorbent paper with a removable and reusable lid to seal the box prior to disposal. However, it has a different structure than does the present invention. U.S. Pat. No. 3,416,495 issued to Wilson on Dec. 17, 1968, teaches various shapes of litter boxes with disposable liners. U.S. Pat. No. 2,963,003 issued to Oberg, et al. on Dec. 6, 1960, discloses a triangular shaped litter box for holding sand on a cleaning grate. Finally, U.S. Pat. No. 4,716,853 issued to d'Aniello on Jan. 5, 1988, teaches a disposable litter box made of plastic with litter in the bottom, having an optional removable top that has bowls on its underside for feeding pets.

Although there are numerous patent litter boxes in the prior art, some of which are disposable, none has the same structure, features and advantages of the present invention.

SUMMARY OF THE INVENTION

The major objects of the present invention are to provide a litter box which:

eliminates the unpleasant task of cleaning the litter box;

is easily and quickly disposable;

is resealable prior to disposal;

is easily and quickly disposable;

is easily shipped and stored;

is inexpensive; and is pre-filled with litter ready for use.

The above invention fulfills the above and other objects by providing a pet litter container which is completely disposable, having a bottom and four upright side walls which are attached to the periphery of the bottom. A moisture-impermeable bag for holding litter material is secured to the inside of the bottom of the box. During use the bag containing the litter materials is in an open position with its top edges wrapped around the sides of the container. When the litter box is ready for disposal the bag is closed, generally by means of a drawstring at the top of the bag and then the entire container is disposed of and replaced with another for use. The moisture-impermeable bag would preferably be filled with litter material at the time of purchase, but could be sold without the litter and filled later. The sides of the four upright sides of the litter box would preferably slant outward from the bottom so that multiple boxes could nest with each other for easy shipping and storage. At the time of sale a cover, which would fit into the interior over the bag, would hold the bag in place prior to use. The cover may have two finger hold tabs for easy removal. The litter box itself could also contain hand holes in at least two opposite sides of the box for easier carrying. In order to secure the bag within the container, glue could be used.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENT

Figure 1:
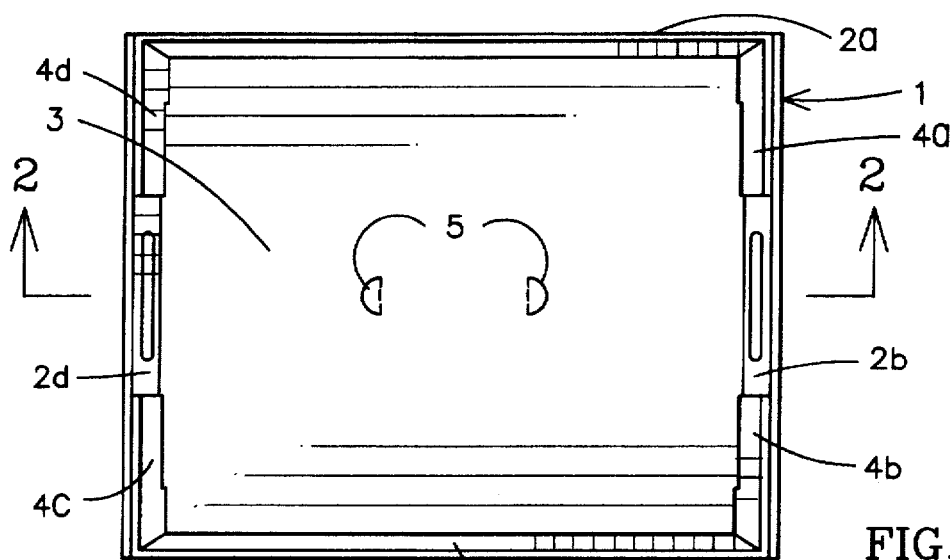
FIG. 1 is a top view of the litter box of this invention in an assembled condition.
Figure 2:
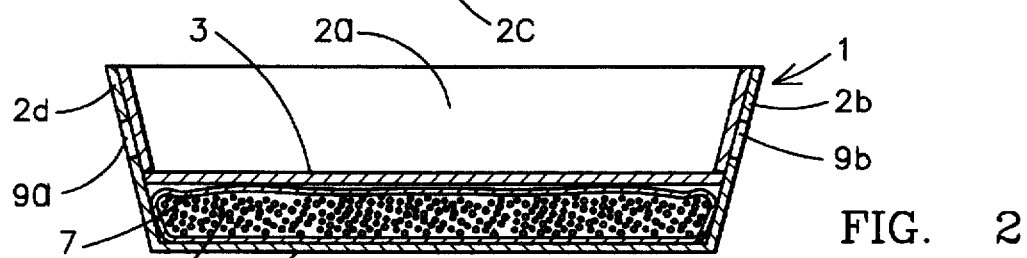
FIG. 2 is a cross-sectional view of the invention across lines 1—1 of FIG. 1.

Referring now to the drawings, in FIGS. 1 and 2 the litter container of this invention has a litter box 1 having a bottom 6 and four upright walls 2a, 2b, 2c and 2d attached to the periphery of said bottom 6. As shown, the four walls 2a, 2b, 2c and 2d may be slanted slightly outward from the bottom so that multiple boxes can nest on top of each other for easier shipping and handling. The litter box would have a bag 7 secured inside the bottom 6 of the container. This bag would preferably be made of plastic or other moisture-impermeable material. The bag 7 would be used to hold litter 8, usually a granular moisture-absorbent material. The bag 7 can be held in place during shipment by a cover 3. The cover 3 may have finger holes or tabs 5 so that fingers can be inserted into said holes to pull the cover upward and outward to expose the bag 7 for opening and use. Hand holes 9a and 9b can be positioned on at least two opposite sides of the litter box into which to place hands for carrying the litter box 1.

Figure 3:
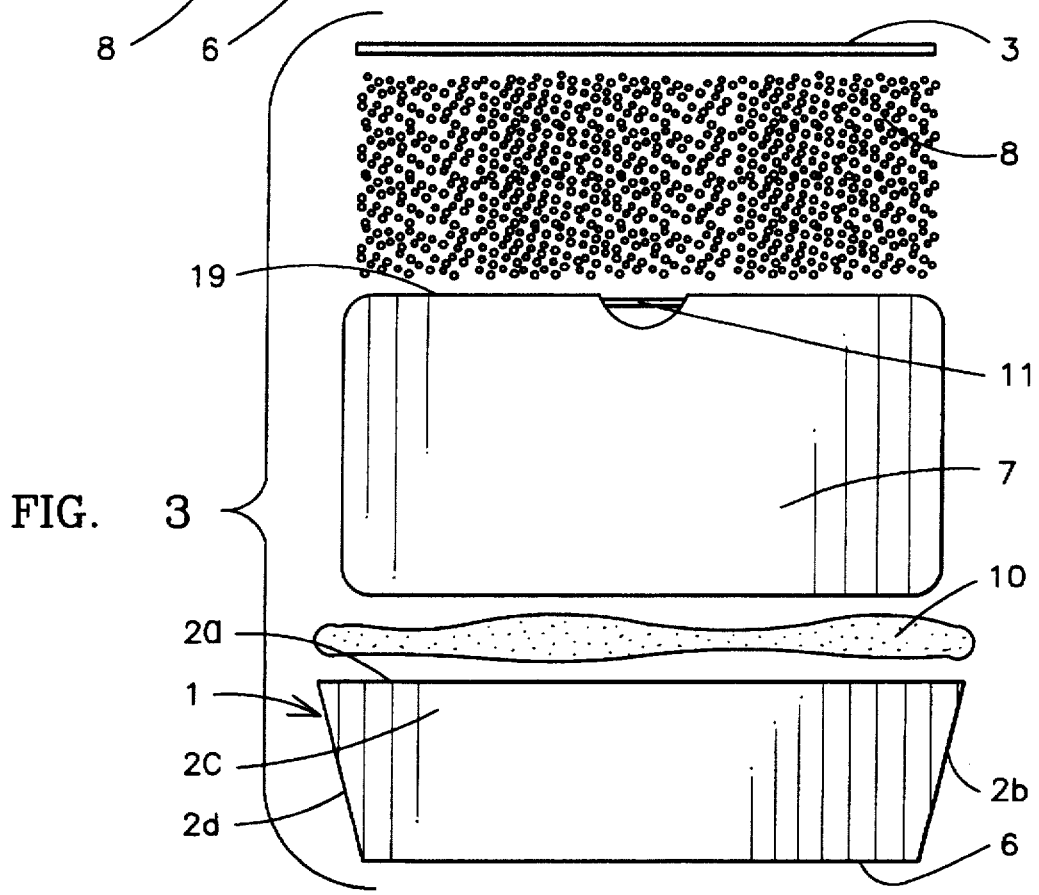
FIG. 3 is an exploded side view showing the components of the invention.

FIG. 3 best illustrates the components of the invention in an exploded fashion. The litter box 1 is shown with the bottom 6 and side walls 2a, 2b, 2c and 2d. A glue or epoxy 10 is used to secure the bag 7 to the inside of the bottom 6 of the box 1. A draw string 11 is shown at the top of the bag to close the top 19 of the bag 7 prior to disposal of the litter container. Although the litter 8, consisting of cat litter readily available on the market, is already in the bag 7 preferably before sale, the bag 7 could be sold empty and the litter 8 placed in it by the pet owner after sale. Finally, the cover 3 may be inserted over the bag 7 to cover the bag during shipping.

Figure 4:
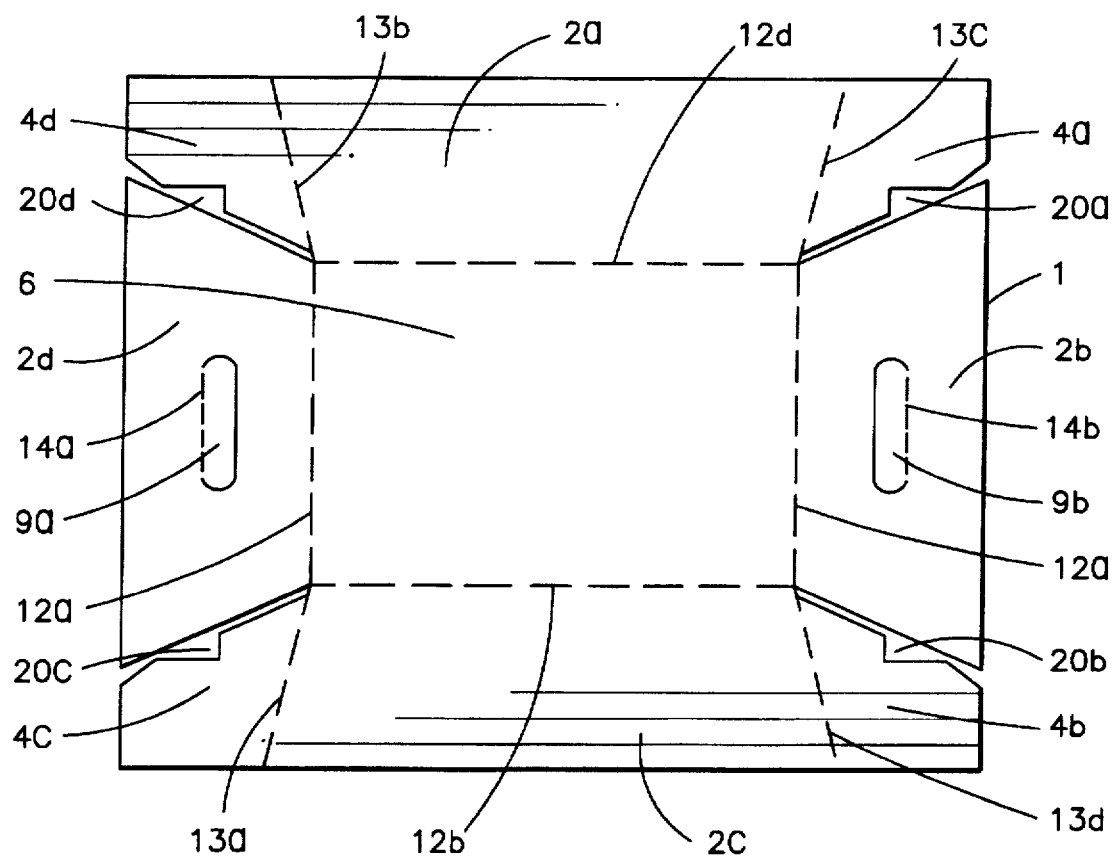
FIG. 4 is a top view of the litter box of this invention in a flat disassembled condition.

Referring to FIG. 4, the litter box 1 of the invention is shown in its preassembled flattened position. As previously mentioned, the box 1 has a bottom 6 and four side walls 2a, 2b, 2c and 2d. Two of the side walls, specifically 2a and 2c would have flaps on each side wall, such as 4a and 4d on side wall 2a and 4b and 4c on side wall 2c, respectively. When the side walls are all folded inward along fold lines 12a, 12b, 12c and 12d the flaps 4a, 4b, 4c and 4d would also be folded inside of side walls 2b and 2d and secured by glue placed between the flaps 4a, 4b, 4c and 4d and the side walls 2a, 2b, 2c and 2d. Each flap has a notch or cut-out 20a, 20b, 20c and 20d in it so that when the flaps are folded inward they form a notch into which holding tabs 16a and 16b with notches 18a, 18b, 18c and 18d on the cover shown in FIG. 5 fit to hold the cover in place when it is used with the box as shown in FIGS. 1 and 2. Additional optional features of the box shown in FIG. 4 include hand-carrying tabs or holes 9a and 9b in opposites sides of the box which would be pressed inward along fold lines 14a and 14b to make carrying the litter box easier.

Figure 5:
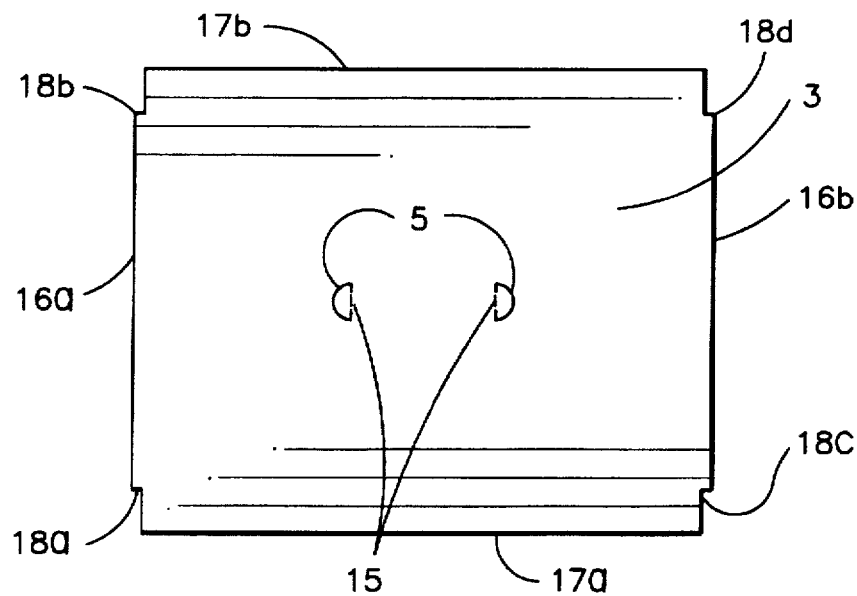
FIG. 5 is a top view of the cover of the litter box.

In FIG. 5 the optional cover 3 is designed to be placed over the bag 7 as shown. Of course, the cover 3 has peripheral sides 17a, 17b, 17c and 17d matching the shape of the bottom 6 of the litter box 1, but is slightly greater in area than the bottom 6 so that it would fit only part way down into the litter box 1. As mentioned earlier, the holding tabs 16a and 16b with notches 18a, 18b, 18c and 18d fit into the notches or cut outs 20a, 20b, 20c and 20d on the flaps 4a, 4b, 4c and 4d of the box 1 so that the cover 3 is held securely in place. Finger tabs or holes 5 could be pressed inward along fold lines 15 to make removing the cover easier prior to use.

Figure 6:
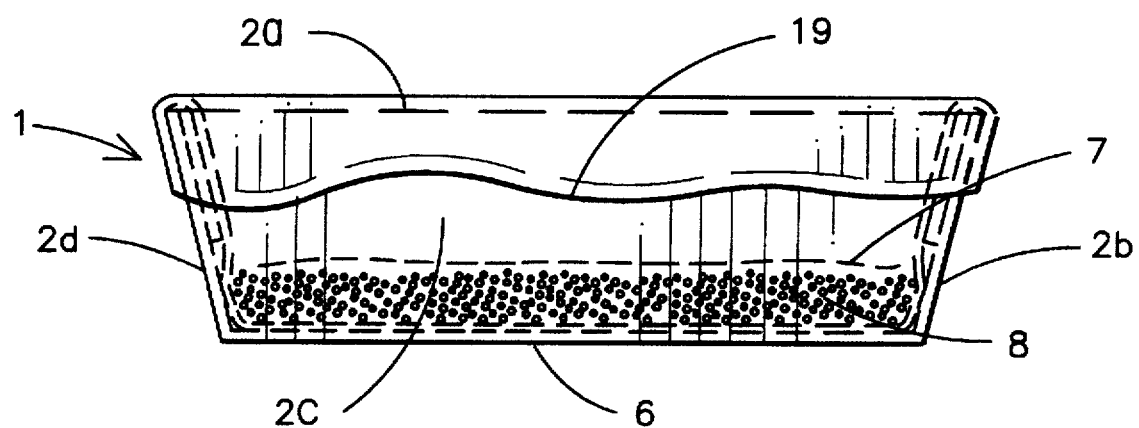
FIG. 6 is a side plan view of the invention in a use position.

In FIG. 6 the litter box 1 is shown in the use condition. The use condition of the litter box 1 is arrived at by removing the cover 3 from inside the box, opening the bag 7 and spreading the top 19 over the side walls 2a, 2b, 2c and 2d of the box 1 to hold the bag in place during use. Preferably, the bag 7 would be ready for immediate use as it is pre-filled with litter material 8. However, it could also be sold without the litter material and then filled prior to use.

Figure 7:
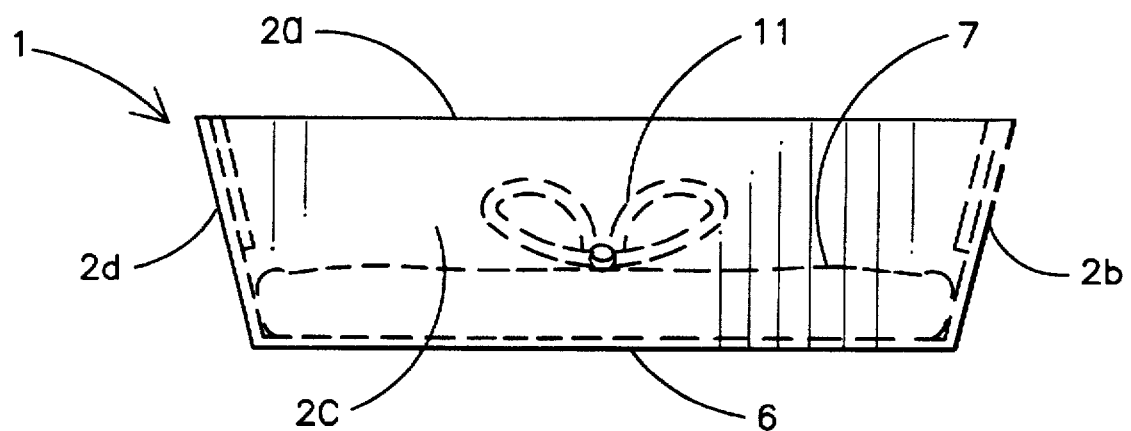
FIG. 7 is a side plan view of the litter box in a disposable condition.

FIG. 7 shows the litter box 1 wherein the bag 7 has been removed from the side walls 2a, 2b, 2c and 2d of the container and the drawstring 11 is pulled to close the bag 7 and then tied. Once this is accomplished the entire litter container of the invention can be disposed of without the need to change litter or feces from the litter box.

Although only a rectangular embodiment has been illustrated in the drawings, the litter box of this invention could take almost any shape, for example, triangular to fit into a corner or circular, using the same basic construction as described above.

Although only a few embodiments of the present invention have been described in detail hereinabove, all improvements and modifications to this invention within the scope or equivalents of the claims are covered by this invention.

List of Components (For convenience of the Examiner)

1. disposable litter box
2a,b,c,d. side walls of litter box
3. litter box cover
4a,b,c,d. flaps on litter box
5. finger holes/tabs
6. bottom of litter box
7. litter bag
8. litter (granular material)
9a,b. hand carrying holes/tabs
10. glue
11. tie strings
12a,b,c,d. side wall fold lines
13a,b,c,d. flap fold lines
14a,b. hand carrying hole fold lines
15. fold lines for finger holes/tabs
16a,b. holding tab in cover
17a,b. sides of cover
18a,b,c,d. notches in side of cover holding tab
19. top of bag
20a,b,c,d. notches in flap

Having thus described my invention, I claim:

1. A completely disposable pet litter container comprising:

a box having a bottom with upright side walls attached to the periphery of said bottom to form an interior capable of holding pet litter material;

a moisture-impermeable bag secured permanently to an inside of the bottom of the box for holding litter material; and means for closing the bag prior to disposal of the container.

2. The pet litter container in claim 1 further comprising a cover which fits into the interior of the box over the bag to hold the bag in place during shipping and storage prior to use.

3. The pet litter container of claim 2 wherein the container and cover are both made of cardboard.

4. The pet litter container of claim 2 wherein the means for closing the bag comprises a string in a top of the bag which can be pulled to close the top and tied to keep the bag in a closed position prior to disposal of the pet litter container.

5. The pet litter container of claim 2 wherein the bag is secured to the inside of the bottom of the box by glue.

6. The pet litter container of claim 2 wherein the bag is pre-filled with litter material.

7. The pet litter container of claim 2 wherein the box has side walls which are tapered so that the side walls slope outwardly from the bottom to allow the box to nest within another like box for easy shipping and storage.

8. The pet litter container of claim 2 wherein the cover has finger holes for easy removal.

9. The pet litter container of claim 2 wherein at least two side walls of the box contain flaps with notches cut therein and the cover contains tabs on two opposite sides so that when the flaps are folded inward and secured to inside the side walls of the container, the cover is secured within the notches in the flaps to hold the cover firmly in place.

10. The pet litter container in claim 1 wherein the container is made of cardboard.

11. The pet litter container of claim 1 wherein the means for closing the bag comprises a string in a top of the bag which can be pulled to close the top and tied to keep the bag in a closed position prior to disposal of the pet litter container.

12. The pet litter container of claim 1 wherein the bag is secured to the inside of the bottom of the box by glue.

13. The pet litter container of claim 1 wherein the bag is pre-filled with litter material.

14. The pet litter container of claim 1 wherein the box has side walls which are tapered so that the side walls slope outwardly from the bottom to allow the box to nest within another like box for easy shipping and storage.

15. The pet litter container of claim 1 wherein the box has hand-lifting holes in at least two opposite sides of the box for use when carrying the box.

* * * * *